Patented Jan. 12, 1932

1,840,420

UNITED STATES PATENT OFFICE

KLAUS WEINAND, OF COLOGNE-FLITTARD, GERMANY, ASSIGNOR TO GENERAL ANILINE WORKS, INC., OF NEW YORK, N. Y., A CORPORATION OF DELAWARE

NEW WOOL DYESTUFFS OF THE ANTHRAQUINONE SERIES

No Drawing. Application filed February 20, 1930, Serial No. 430,105, and in Germany February 25, 1929.

The present invention relates to new dyestuffs having in their free form the probable formula:

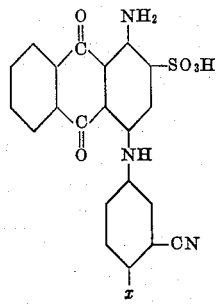

wherein $x$ means hydrogen or methyl.

I have found that technically valuable wool dyestuffs of the above formula are obtainable by reacting upon a 1-amino-4-halogenanthraquinone-2-sulfonic acid with meta-aminobenzonitril or meta-aminotolunitril.

The reaction may be performed in a manner similar to the methods usually applied for the condensatiton of 1-amino-4-halogenanthraquinone-2-sulfonic acids with other aromatic amines. For example, the mixture of the reaction components may be distributed in water and after the addition of a copper catalyst and a weak basic acid binding medium, such as sodium bicarbonate, potassium bicarbonate or the like, the reaction may be performed by heating this mixture.

The products thus obtainable form blue needles, dyeing wool from an acid bath reddish-blue to blue shades. The new dyestuffs are distinguished by good solubility in water and dye substantially more even shades than the known dyestuffs of similar structure, but not containing a nitril group.

The following examples illustrate my invention without restricting it thereto, the parts being by weight.

Example 1

10 parts of 1-amino-4-bromoanthraquinone-2-sulfonic acid, 5 parts of meta-aminobenzonitril, 13 parts of sodium bicarbonate and 0.5 part of cuprous chloride are stirred together with 140 parts of water at room temperature for about 1 hour, and the mixture is thereupon slowly heated to 80° C. for about 3–4 hours while continually stirring. The reaction product, which separates during the reaction, is filtered while still hot and washed with a little cold water. It crystallizes from water in the form of blue needles which are easily soluble in water and dyes wool from an acid bath reddish-blue shades.

Example 2

When replacing in the above example the meta-amino-benzonitril by an equivalent amount of meta-amino-tolunitril, a dyestuff dyeing wool somewhat greener and very even shades is obtained.

I claim:—

The products having in their free form the formula:

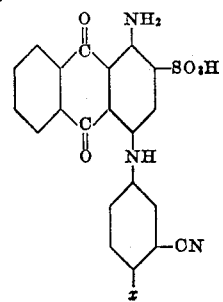

wherein $x$ means hydrogen or methyl, said products forming blue needles easily soluble in water and dyeing wool from an acid bath very even reddish-blue to blue shades.

In testimony whereof, I affix my signature.

KLAUS WEINAND.